United States Patent
Kim et al.

(10) Patent No.: US 9,223,061 B2
(45) Date of Patent: Dec. 29, 2015

(54) METHOD OF RECONSTRUCTING ASPHERIC SURFACE EQUATIONS FROM MEASUREMENTS

(71) Applicants: Dong Ik Kim, Sejong (KR); Geon Hee Kim, Sejong (KR); Ghi Seok Kim, Daejeon (KR); Ki Soo Chang, Daejeon (KR)

(72) Inventors: Dong Ik Kim, Sejong (KR); Geon Hee Kim, Sejong (KR); Ghi Seok Kim, Daejeon (KR); Ki Soo Chang, Daejeon (KR)

(73) Assignee: KOREA BASIC SCIENCE INSTITUTE, Daejeon (KR)

(*) Notice: Subject to any disclaimer, the term of this patent is extended or adjusted under 35 U.S.C. 154(b) by 193 days.

(21) Appl. No.: 13/727,787

(22) Filed: Dec. 27, 2012

(65) Prior Publication Data
US 2014/0188959 A1 Jul. 3, 2014

(51) Int. Cl.
 G06F 17/10 (2006.01)
 G02B 3/02 (2006.01)
 G02B 27/00 (2006.01)
(52) U.S. Cl.
 CPC .............. *G02B 3/02* (2013.01); *G02B 27/0012* (2013.01); *G06F 17/10* (2013.01)
(58) Field of Classification Search
 None
 See application file for complete search history.

(56) References Cited

U.S. PATENT DOCUMENTS

| | | | |
|---|---|---|---|
| 6,445,483 B2 * | 9/2002 | Takada et al. | 359/207.1 |
| 6,606,144 B1 * | 8/2003 | Omura | 355/67 |
| 8,363,129 B2 * | 1/2013 | Ohara et al. | 348/240.99 |
| 2004/0156640 A1 * | 8/2004 | Dress et al. | 398/140 |

OTHER PUBLICATIONS

Yat Hei Lo et al., "Aspheric Lenses for Terahertz Imaging", Optics Express 15991, vol. 16, No. 20, Sep. 2008.
Christine Bouéet al., "Cost-effective infrared thermography protocol..", Infrared Physics & Technology 48, 122-129, Nov. 2005.
J. L. Rouke et al., "Design of three-element night-vision goggle objectives", Applied Optics vol. 37, No. 4, Feb. 1998.
A. G. Poleshchuk et al., Combined computer-generated hologram for testing steep aspheric surfaces, Optics Express 5420, vol. 17, No. 7, Mar. 2009.
Ho-Soon Yang et al., "Null Hartmann test for the fabrication of large aspherice surfaces", Optics Express 1839, vol. 13, No. 6, Mar. 2005.
B. Braunecker et al., "Advanced Optics Using Aspherical Elements", SPIE Press, 2008.
B. N. Taylor et al., "Guidelines for evaluating and expressing the uncertainty of NIST measurement results", NIST Technical Note 1297, 1994 Edition.

* cited by examiner

*Primary Examiner* — Michael D Yaary
(74) *Attorney, Agent, or Firm* — IPLA P.A.; James E. Bame

(57) ABSTRACT

Surface measurement data just provides the coordinates of an object surface without giving various parameters like the radius of curvature, conic constant, and deformation coefficients. In this paper, we propose a novel method for extracting the important parameters for the determination of unknown aspheric surface equations from the measurement of aspheric surfaces. The largest error between the original surface and the reconstructed surface in the theoretical case is shown to be about 8.6 nm. This fact implies that the new method is well suited for the reconstruction of unknown surface equations.

10 Claims, 4 Drawing Sheets

(a)

(b)

METHOD OF RECONSTRUCTING ASPHERIC SURFACE EQUATIONS FROM MEASUREMENTS

BACKGROUND OF INVENTION

Aspheric lens optics have received much attention in scientific, industrial, and military optical systems such as terahertz imaging, diagnostic systems, night-vision systems, and so on because they are able to remove spherical aberration and astigmatism for improving light gathering power and simplifying complex lens designs. For this reason, aspheric optics designs with parameters significantly affecting optical performance are treated as confidential information or are patented. Typically, aspheric surfaces fabricated according to surface designs are characterized by various evaluation methods. However, it is rare to reconstruct aspheric surface equations from surface measurements. In the present invention, a new method for reconstructing the aspheric surface equations from the measurement of unknown aspheric surfaces is disclosed.

SUMMARY OF INVENTION

A method of reconstructing aspheric surface equations in an information processing device from measurements, the method comprises steps for: obtaining $z_{as}(r)$ as r varies from $r_i$ to $r_f$ in steps of $r_{step}$ by measuring a given aspheric surface that is represented by an aspheric surface equation; finding an error curve $\delta z_e$ for each R value while changing R from $R_i$ to $R_f$ in steps of $R_{step}$ wherein K and deformation coefficients are set to 0, wherein the error curve $\delta z_e$ is defined by a deviation of the aspheric surface equation from a quadratic term $z_s(r)$ of the aspheric surface equation; finding the deformation coefficients from $\delta z_e$ using an inverse matrix method; replacing $R_N$ and $a_N$ with each R value and the deformation coefficients found from the $\delta z_e$ in $z_N$, a curve determined by the measured coordinates; checking if a shape error, $\delta z_d$, is within a predetermined threshold value; and determining $R_N$ that is closest to the original R.

The aspheric surface equation may be given by $$z(r) = \frac{\frac{r^2}{R}}{1 + \sqrt{1 - (1+K)\left(\frac{r}{R}\right)^2}} + \sum_{i=2} a_{2i} r^{2i},$$

where K is the conic constant, r is the lateral coordinate, R is the radius of curvature, and the $a_{2i}$ values are the deformation coefficients.

The $z_{as}(r_i)$, the $\delta_s(r)$, the $\delta z_e$, the $z_N$, and the $\delta z_d$ may be given by $$z_{as}(r) = \frac{cr^2}{1 + \sqrt{1-(1+K)c^2 r^2}} + a_4 r^4 + a_6 r^6 + a_8 r^8 + a_{10} r^{10}$$

$$z_s(r) = \frac{cr^2}{1 + \sqrt{1-(1+K)c^2 r^2}}$$

$$\delta z_e = z_{as} - z_s$$

$$z_N(r) = \mathrm{Re}\left[\frac{c_N r^2}{1 + \sqrt{1-(1+K)c_N^2 r^2}} + a_{N4} r^4 + a_{N6} r^6 + a_{N8} r^8 + a_{N10} r^{10}\right]$$

$$\delta z_d = |z_{as} - z_N|$$

where c and $c_N$ are the curvatures, which are the reciprocals of R and $R_N$; $z_N$ is the curve determined by the measured coordinate; $a_{N4}, \ldots, a_{N10}$ are the deformation coefficients calculated with our method, and $\delta z_d$ is the shape error, which is the deviation from the original curve $z_{as}$.

In an embodiment of the present invention, the $r_i$ may be 0, the $r_f$ 35 mm, and the $r_{step}$ about 3.5 mm.

The $R_i$ may be 20 mm, the $R_f$ 120 mm, and the $R_{step}$ about 0.0001 mm.

The predetermined threshold value may be about 10 nm.

The method may further comprises steps for: setting the R and the $R_N$ with the determined values; finding an error curve $\delta z_e$ for each K value while changing K from $K_i$ to $K_f$ in steps of $K_{step}$; finding the deformation coefficients from $\delta z_e$ using an inverse matrix method; replacing $K_N$ and $a_N$ with each K value and the deformation coefficients found from the $\delta z_e$ in $z_N$, a curve determined by the measured coordinates; checking if a shape error, $\delta z_d$, is within a predetermined threshold value; and determining $K_N$ that is closest to the original K.

The $K_i$ may be −1.0, the $K_f$ 1.0, and the $K_{step}$ about 0.001.

The inverse matrix method comprises steps for: representing the coordinate data $(r_i, z_{as}(r_i))$ by n+1 nth-order polynomial equations with polynomial coefficients, $a_0, a_1, \ldots, a_n$; writing the n+1 nth-order polynomial equations in a form of matrix multiplication, $Xa=b$, where X is a variable matrix, a is a coefficient vector, and b is a function vector; and calculating the polynomial coefficients, $a_0, a_1, \ldots, a_n$ using $a = X^{-1}b$.

The deformation coefficients may be obtained by $$\begin{bmatrix} a_4 \\ a_6 \\ a_8 \\ a_{10} \end{bmatrix} = \begin{bmatrix} (r_0)^4 & (r_0)^6 & (r_0)^8 & (r_0)^{10} \\ (r_1)^4 & (r_1)^6 & (r_1)^8 & (r_1)^{10} \\ \vdots & \vdots & \vdots & \vdots \\ (r_{10})^4 & (r_{10})^6 & (r_{10})^8 & (r_{10})^{10} \end{bmatrix}^{-1} \begin{bmatrix} \delta z_{e0} \\ \delta z_{e1} \\ \vdots \\ \delta z_{e10} \end{bmatrix}.$$

The method according to the present invention provides a powerful method of reconstructing aspheric surface from measurements. And, further the method can be applied to aspheric lens optics easily.

DETAILED DESCRIPTION OF INVENTION

Figure 1:
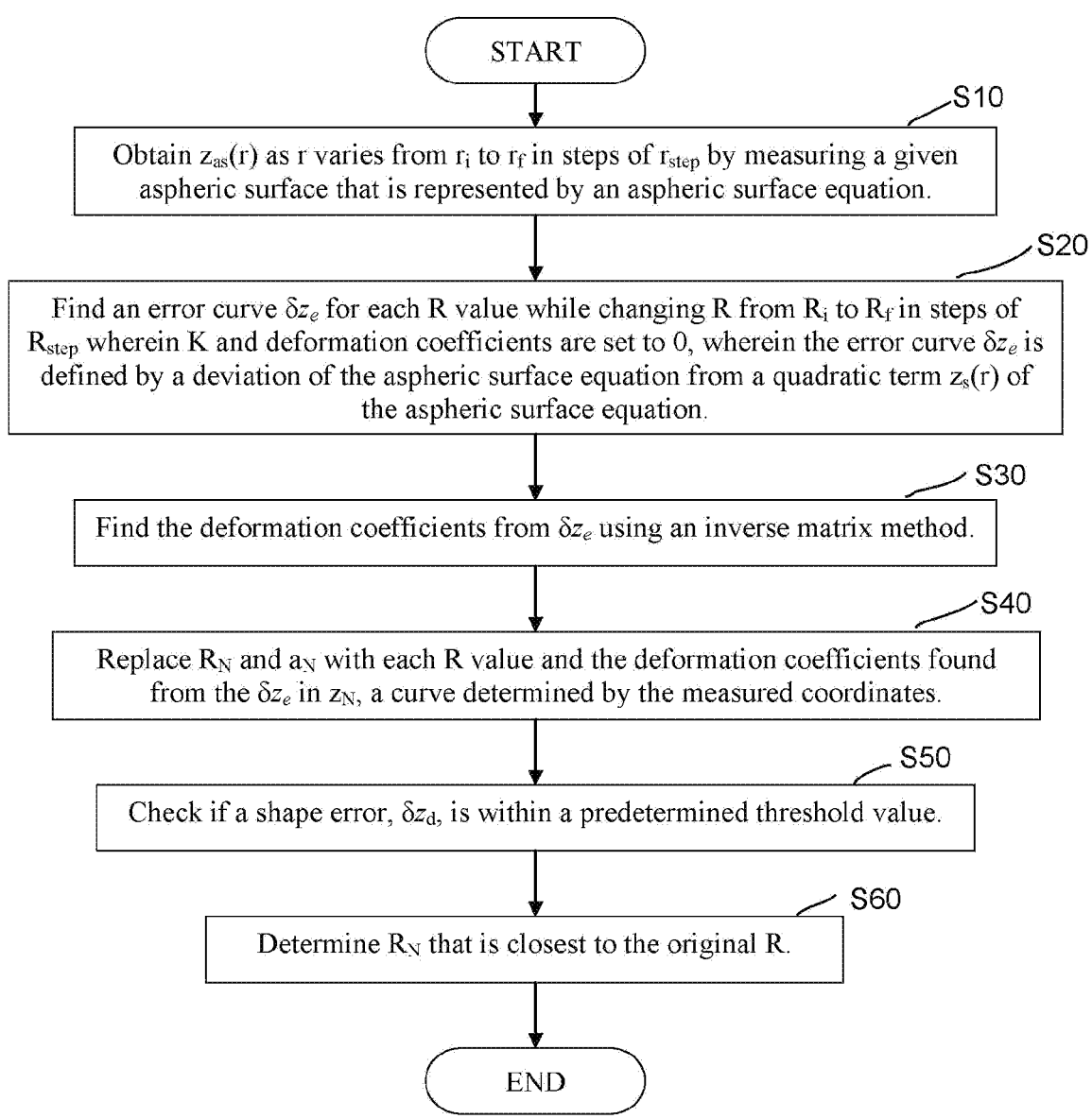
FIG. 1 shows a flowchart illustrating steps for finding R in a method of reconstructing aspheric surface.
Figure 2:
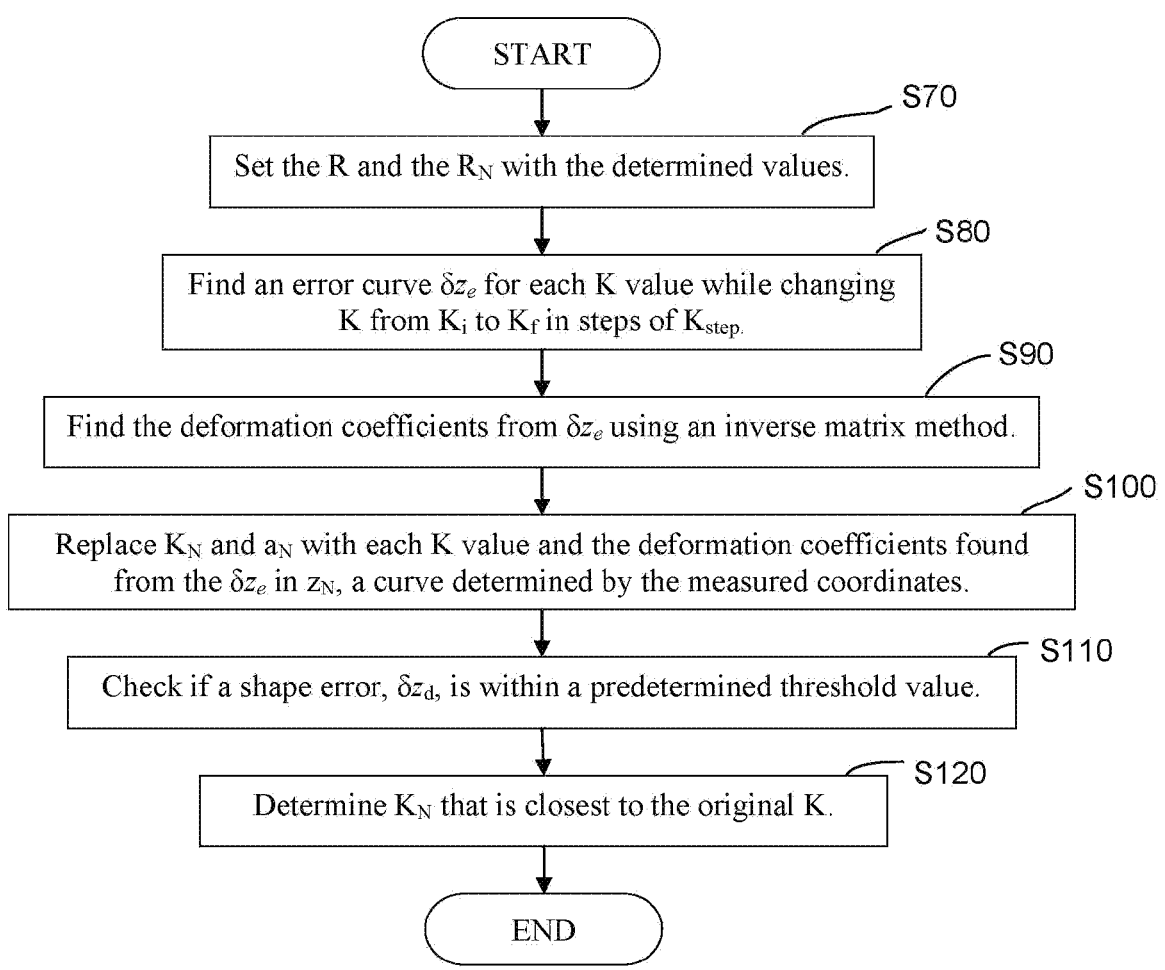
FIG. 2 shows a flowchart illustrating steps for finding K in a method of reconstructing aspheric surface.

FIGS. 1 and 2 show flowcharts illustrating methods of reconstructing of unknown aspheric surface equations from measurement of aspheric surfaces.

A method of reconstructing aspheric surface equations in an information processing device from measurements, the method comprising steps for: obtaining $z_{as}(r)$ as r varies from $r_i$ to $r_f$ in steps of $r_{step}$ by measuring a given aspheric surface that is represented by an aspheric surface equation (S10); finding an error curve $\delta z_e$ for each R value while changing R from $R_i$ to $R_f$ in steps of $R_{step}$ wherein K and deformation coefficients are set to 0, wherein the error curve $\delta z_e$ is defined by a deviation of the aspheric surface equation from a quadratic term $z_s(r)$ of the aspheric surface equation (S20); finding the deformation coefficients from $\delta z_e$ using an inverse matrix method (S30); replacing $R_N$ and $a_N$ with each R value and the deformation coefficients found from the $\delta z_e$ in $z_N$, a curve determined by the measured coordinates (S40); checking if a shape error, $\delta z_d$, is within a predetermined threshold value (S50); and determining $R_N$ that is closest to the original R (S60).

The aspheric surface equation may be given by $$z(r) = \frac{\frac{r^2}{R}}{1 + \sqrt{1 - (1+K)\left(\frac{r}{R}\right)^2}} + \sum_{i=2} a_{2i} r^{2i},$$

where K is the conic constant, r is the lateral coordinate, R is the radius of curvature, and the $a_{2i}$ values are the deformation coefficients.

The $z_{as}(r_i)$, the $z_s(r)$, the $\delta z_e$, the $z_N$, and the $\delta z_d$ may be given by $$z_{as}(r) = \frac{cr^2}{1 + \sqrt{1 - (1+K)c^2 r^2}} + a_4 r^4 + a_6 r^6 + a_8 r^8 + a_{10} r^{10}$$

$$z_s(r) = \frac{cr^2}{1 + \sqrt{1 - (1+K)c^2 r^2}}$$

$$\delta z_e = z_{as} - z_s$$

$$z_N(r) = \mathrm{Re}\left[\frac{c_N r^2}{1 + \sqrt{1 - (1+K)c_N^2 r^2}} + a_{N4} r^4 + a_{N6} r^6 + a_{N8} r^8 + a_{N10} r^{10}\right]$$

$$\delta z_d = |z_{as} - z_N|$$

where c and $c_N$ are the curvatures, which are the reciprocals of R and $R_N$; $z_N$ is the curve determined by the measured coordinate; $a_{N4}, \ldots, a_{N10}$ are the deformation coefficients calculated with our method, and $\delta z_d$ is the shape error, which is the deviation from the original curve $z_{as}$.

In an embodiment of the present invention, the $r_i$ may be 0, the $r_f$ 35 mm, and the $r_{step}$ about 3.5 mm. The $R_i$ may be 20 mm, the $R_f$ 120 mm, and the $R_{step}$ about 0.0001 mm. The predetermined threshold value may be about 10 nm.

In addition to the above steps for finding R, in order to find K, the method may further comprises steps for: setting the R and the $R_N$ with the determined values (S70); finding an error curve $\delta z_e$ for each K value while changing K from $K_i$ to $K_f$ in steps of $K_{step}$ (S80); finding the deformation coefficients from $\delta z_e$ using an inverse matrix method (S90); replacing $K_N$ and $a_N$ with each K value and the deformation coefficients found from the $\delta z_e$ in $z_N$, a curve determined by the measured coordinates (S100); checking if a shape error, $\delta z_d$, is within a predetermined threshold value (S110); and determining $K_N$ that is closest to the original K (S120).

The $K_i$ may be −1.0, the $K_f$ 1.0, and the $K_{step}$ about 0.001.

The inverse matrix method comprises steps for: representing the coordinate data $(r_i, z_{as}(r_i))$ by n+1 nth-order polynomial equations with polynomial coefficients, $a_0, a_1, \ldots, a_n$; writing the n+1 nth-order polynomial equations in a form of matrix multiplication, Xa=b, where X is a variable matrix, a is a coefficient vector, and b is a function vector; and calculating the polynomial coefficients, $a_0, a_1, \ldots, a_n$ using $a = X^{-1} b$.

The deformation coefficients may be obtained by $$\begin{bmatrix} a_4 \\ a_6 \\ a_8 \\ a_{10} \end{bmatrix} = \begin{bmatrix} (r_0)^4 & (r_0)^6 & (r_0)^8 & (r_0)^{10} \\ (r_1)^4 & (r_1)^6 & (r_1)^8 & (r_1)^{10} \\ \vdots & \vdots & \vdots & \vdots \\ (r_{10})^4 & (r_{10})^6 & (r_{10})^8 & (r_{10})^{10} \end{bmatrix}^{-1} \begin{bmatrix} \delta z_{e0} \\ \delta z_{e1} \\ \vdots \\ \delta z_{e10} \end{bmatrix}.$$

In general, arbitrary curves including two-dimensional shapes are given by data in the form of various coordinates, $(x_0, y_0), (x_1, y_1), \ldots, (x_n, y_n)$. This data can be represented by an nth-order polynomial equation, as follows:

$$y = a_0 + a_1 x + a_2 x^2 + \ldots + a_n x^n \qquad (1)$$

where $a_0, a_1, \ldots, a_n$ are the polynomial coefficients. Substituting each of the n+1 (x, y) pairs into Eq. (1) yields the following n+1 equations:

$$a_0 + a_1 x_0 + a_2 (x_0)^2 + \ldots + a_n (x_0)^n = y_0 \qquad (2)$$
$$a_0 + a_1 x_1 + a_2 (x_1)^2 + \ldots + a_n (x_1)^n = y_1$$
$$\vdots$$
$$a_0 + a_1 x_n + a_2 (x_n)^2 + \ldots + a_n (x_n)^n = y_n$$

Equation (2) is a system of nth-order equations having the unknown quantities $a_0, a_1, \ldots, a_n$. Here, however, Eq. (2) can be considered a system of linear equations with respect to the $a_i$ coefficients (where $i=0, \ldots, n$) because the (x, y) values can be determined through measurements. Therefore, the equation can be written in the form of matrix multiplication, Xa=b, where X is the variable matrix, a is the coefficient vector, and b is the function vector. The result, represented as a matrix calculation, is as follows:

$$\begin{bmatrix} 1 & x_0 & (x_0)^2 & \ldots & (x_0)^n \\ 1 & x_1 & (x_1)^2 & \ldots & (x_1)^n \\ \vdots & \vdots & \vdots & \ddots & \vdots \\ 1 & x_n & (x_n)^2 & \ldots & (x_n)^n \end{bmatrix} \begin{bmatrix} a_0 \\ a_1 \\ \vdots \\ a_n \end{bmatrix} = \begin{bmatrix} y_0 \\ y_1 \\ \vdots \\ y_n \end{bmatrix} \qquad (3)$$

We want to solve Eq. (3) for the elements of the vector a. So, a can be found by multiplying the inverse matrix $X^{-1}$ of X at either side, as follows:

$$X^{-1} X a = X^{-1} b$$

$$a = X^{-1} b \qquad (4)$$

In order for it be possible to calculate the inverse of the matrix X (that is, for X to be invertible), det(X) must not be equal to zero. In practice, if a is found by Eq. (4), the original equation can be reconstructed from the coefficients in the vector a. If we measure the curve given by a certain equation, the measured values will be y values for the corresponding x values. An important point here is that when we do not know the equation of the curve, the measured value will be y, which contains the coefficients multiplied by suitable powers of the corresponding x value. So, the coefficients become the elements of the vector a extracted from the calculation in Eq. (4). We refer to this method as the inverse matrix method.

Figure 3:
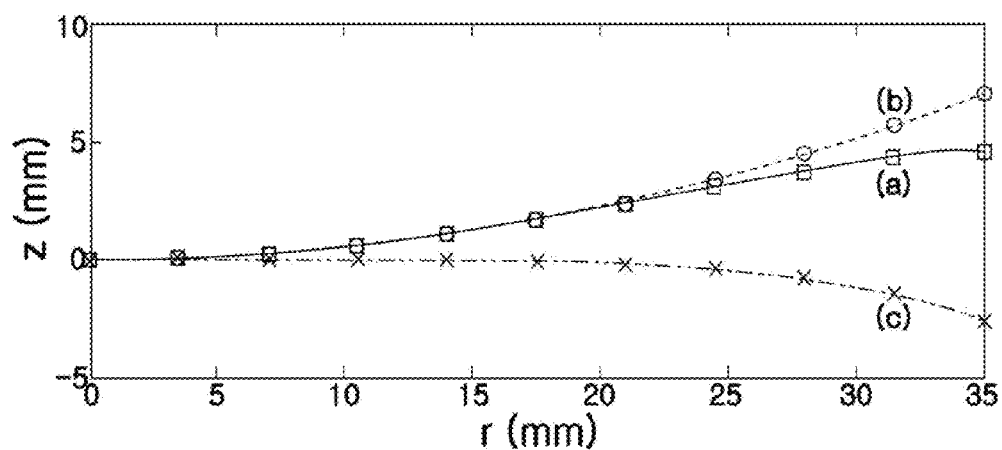
FIG. 3 shows three different curves illustrating an original aspheric curve, a spherical curve, and an error curve.

In general, an aspheric surface equation[7] is given by $$z(r) = \frac{\frac{r^2}{R}}{1+\sqrt{1-(1+K)\left(\frac{r}{R}\right)^2}} + \sum_{i=2} a_{2i} r^{2i} \quad (5)$$

where K is the conic constant, r is the lateral coordinate, R is the radius of curvature, and the $a_{2i}$ values are the deformation coefficients. To verify the validity of the inverse matrix method, let us suppose an arbitrary aspheric equation $z_{as}$, which has a radius of curvature at the vertex is R=89 mm, a diameter of $\phi$=70 mm, a conic constant of K=0, and deformation coefficients of $a_4$=−5×10$^{-9}$, $a_6$=−2.075×10$^{-9}$, $a_8$=7.65625×10$^{-13}$, and $a_{10}$=−1.67481×10$^{-16}$. Now, we must reconstruct the aspheric surface equation from the coordinate data (r, $z_{as}$) of Eq. (5) with the known parameters. When K=0 and $a_{2i}$=0, Eq. (5) includes a spherical equation that can be considered as the basic form of the aspheric surface equation. So R, the radius of the circle, must be found. In order to find R, we must calculate the error curve $\delta z_e(r) = z_{as} - z_s$, where $z_{as}$ is the entire equation itself and $z_s$ is just the quadratic term in Eq. (5), neglecting the higher-order terms. FIG. 3 shows (a) the original aspheric curve $z_{as}$, (b) the spherical curve $z_s$, and (c) the error curve $\delta z_e$, which represents the difference between $z_{as}$ and $z_s$. The deformation coefficients can be found from the error curve by using the inverse matrix method.

As r varies from 0 to 35 mm in steps of 3.5 mm, 11 data points are obtained from $\delta z_e(r)$. Here, as there are 11 r values, 11 deformation coefficients are also obtained. Among these coefficients, we are interested in the 4th-, 6th-, 8th-, and 10th-order coefficients due to Eq. (5). Therefore, others coefficients, like the constant and the odd-order coefficients, are omitted in the process of matrix calculation of the error curve. This calculation of the error curve is also in the form of Xa=b like Eq. (3) and is given by Eq. (6). In Eq. (6), the X matrix is 11×4, and the a vector is 4×1, so the b vector must be 11×1. In order to find the coefficient vector a, both sides of the equation are multiplied by the inverse matrix $X^{-1}$, and since $X^{-1}$ is 4×11, the product of $X^{-1}$ and b will be 4×1. Therefore, the matrix calculation works because the result equals a, as shown by Eq. (7).

$$\begin{bmatrix} (r_0)^4 & (r_0)^6 & (r_0)^8 & (r_0)^{10} \\ (r_1)^4 & (r_1)^6 & (r_1)^8 & (r_1)^{10} \\ \vdots & \vdots & \vdots & \vdots \\ (r_{10})^4 & (r_{10})^6 & (r_{10})^8 & (r_{10})^{10} \end{bmatrix} \begin{bmatrix} a_4 \\ a_6 \\ a_8 \\ a_{10} \end{bmatrix} = \begin{bmatrix} \delta z_{e0} \\ \delta z_{e1} \\ \vdots \\ \delta z_{e10} \end{bmatrix} \quad (6)$$

$$\begin{bmatrix} a_4 \\ a_6 \\ a_8 \\ a_{10} \end{bmatrix} = \begin{bmatrix} (r_0)^4 & (r_0)^6 & (r_0)^8 & (r_0)^{10} \\ (r_1)^4 & (r_1)^6 & (r_1)^8 & (r_1)^{10} \\ \vdots & \vdots & \vdots & \vdots \\ (r_{10})^4 & (r_{10})^6 & (r_{10})^8 & (r_{10})^{10} \end{bmatrix}^{-1} \begin{bmatrix} \delta z_{e0} \\ \delta z_{e1} \\ \vdots \\ \delta z_{e10} \end{bmatrix} \quad (7)$$

In reality, we only know the coordinate data (r, $z_{as}$) from the surface measurement and not R, K, and the a coefficient values. The following equations are given to find R, K, and the a coefficients.

$$z_{as}(r) = \frac{cr^2}{1+\sqrt{1-(1+K)c^2 r^2}} + a_4 r^4 + a_6 r^6 + a_8 r^8 + a_{10} r^{10} \quad (8)$$

$$z_s(r) = \frac{cr^2}{1+\sqrt{1-(1+K)c^2 r^2}}$$

$$\delta z_e = z_{as} - z_s$$

$$z_N(r) = \mathrm{Re}\left[\frac{c_N r^2}{1+\sqrt{1-(1+K)c_N^2 r^2}} + a_{N4} r^4 + a_{N6} r^6 + a_{N8} r^8 + a_{N10} r^{10}\right]$$

$$\delta z_d = |z_{as} - z_N|$$

where c and $c_N$ are the curvatures, which are the reciprocals of R and $R_N$; $z_N$ is the curve determined by the measured coordinate; $a_{N4}, \ldots, a_{N10}$ are the deformation coefficients calculated with our method, and $\delta z_d$ is the shape error, which is the deviation from the original curve $z_{as}$. The procedure for finding the parameters is as follows:

(1) Obtain $z_{as}$ through measurements as r varies from 0 to 35 mm in steps of 3.5 mm.

(2) Change R from 20 to 120 mm in steps of 0.0001 mm, where K and $a_4, \ldots, a_{10}$ are set to 0.

(3) Find the error curve $\delta z_e$ for each R value.

(4) Find the deformation coefficients from $\delta z_e$ using the inverse matrix method.

(5) In $z_N$, replace $R_N$ and $a_N$ with each R value and the deformation coefficients found from $\delta z_e$.

(6) Check if $\delta z_d$ is within a desired threshold value.

Figure 4:
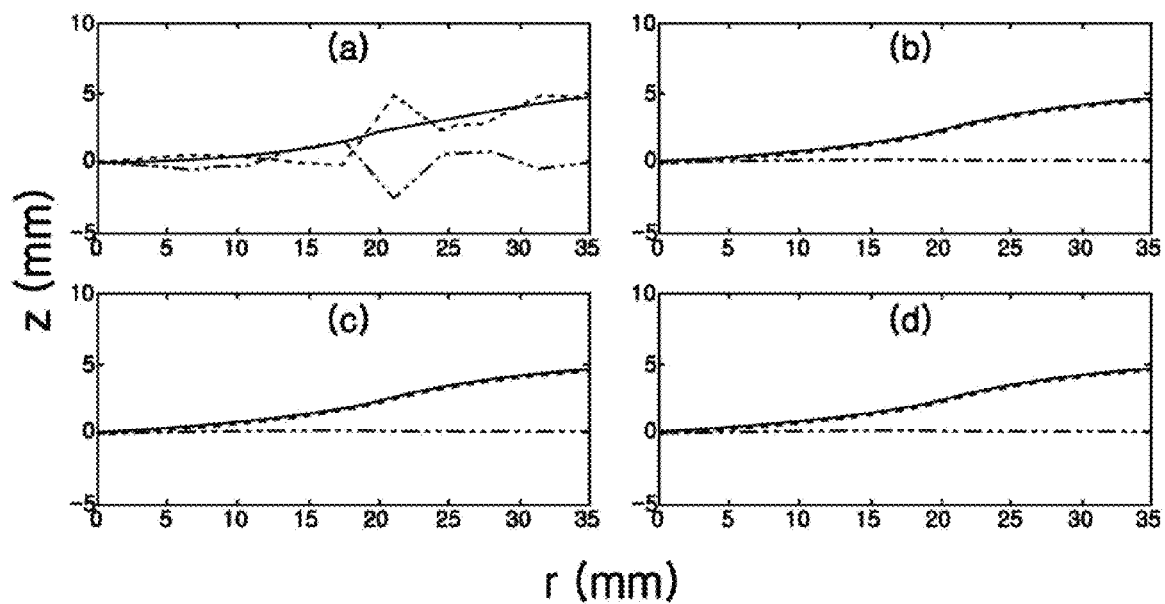
FIGS. 4(a) to 4(d) each show procedures for finding a radius of curvature.

This procedure was implemented in an information processing unit such as a computer, using a well-known MATLAB® program and was repeated iteratively until the $\delta z_d$ value fell below some threshold value. In this case, the threshold value was 1×10$^{-5}$ mm (10 nm), and then the relevant $R_N$ was 89.0013 mm. FIGS. 4(a) to 4(d) each shows the procedure for finding the $R_N$ closest to the original R, more specifically, for finding the radius of curvature $R_N$, where the red line is $z_{as}$, the cyan line is $z_N$, and the green line is $z_d$, in which (a) $R_N$=20.0000 mm, (b) $R_N$=60.0000 mm, (c) $R_N$=89.0013 mm, and (d) $R_N$=120.0000 mm. As $R_N$ approaches the original R, $\delta z_d$ goes to 0. Here, the minimized $\delta z_d$ was obtained when $R_N$=89.0013 mm as shown in FIG. 4(c). After that, $R_N$ increased further, and $\delta z_d$ increased again. Table 1 shows $\delta z_d$ for various r values when $R_N$ is 89.0013 mm. Even the largest $\delta z_d$ is no larger than about 9.77 nm at r=31.5 mm, so this result is quite satisfactory. One thing to keep in mind is that the coordinate data of $z_{as}$ will correspond to the measurement data of an unknown aspheric lens surface later, and it will become a reference used to find R.

TABLE 1

Minimized $\delta z_d$ values found for $R_N$ = 89.0013 mm

| $R_N$ (mm) | r (mm) | $\delta z_d$ (mm) |
|---|---|---|
| 89.0013 | 0 | 0.0000 |
| | 3.5 | $9.2793 \times 10^{-7}$ |
| | 7 | $2.8688 \times 10^{-6}$ |
| | 10.5 | $3.8795 \times 10^{-6}$ |
| | 14 | $2.3828 \times 10^{-6}$ |
| | 17.5 | $1.2827 \times 10^{-6}$ |
| | 21 | $4.3100 \times 10^{-6}$ |
| | 24.5 | $2.8575 \times 10^{-6}$ |
| | 28 | $4.1517 \times 10^{-6}$ |
| | 31.5 | $9.7711 \times 10^{-6}$ |
| | 35 | $4.6779 \times 10^{-6}$ |

The deformation coefficients extracted from the inverse matrix method (7) for $R_N$=89.0013 mm are compared with the original one in Table 2. The extracted

TABLE 2

Comparison between original and extracted deformation coefficients

| Deformation coefficient | Original | Extracted |
|---|---|---|
| $a_4$ | $-5 \times 10^{-9}$ | $-4.465 \times 10^{-9}$ |
| $a_6$ | $-2.075 \times 10^{-9}$ | $-2.076 \times 10^{-9}$ |
| $a_8$ | $7.65625 \times 10^{-13}$ | $7.6632 \times 10^{-13}$ |
| $a_{10}$ | $-1.67481 \times 10^{-16}$ | $-1.6763 \times 10^{-16}$ | where coefficients are very similar to the original ones. This suggests that the inverse matrix method is quite effective.

In the case where K=−0.8 in Eq. (5) rather than K=0, we were able to find R, K, and a using the inverse matrix method. In the same way, when K=0, R was found to be 88.998. In this case, the R value (88.998) differs from its value in the previous case (89.0013) due to the difference in K. Now, K can be also determined in a way that is similar to the way that R was found. To find K, we applied R=88.998 to Eq. (8) and changed K from −1 to 1 in steps of 0.001, and then examined the value of K that occurred for shape error values less than $\delta z_d$=1×10$^{-5}$ mm. The resultant K was −0.732, and at that time, the largest $\delta z_d$ was 8.6152×10$^{-6}$ mm (about 8.6 nm). Finally, the deformation coefficients were $a_4$=−1.7652×10$^{-8}$, $a_6$=−2.0746×10$^{-9}$, $a_8$=7.6537×10$^{-13}$, and $a_{10}$=−1.6752×10$^{-16}$. Although the extracted K and the deformation coefficients are somewhat different than the original ones, the result is satisfactory because the largest shape error $\delta z_d$ is no larger than about 8.6 nm.

Figure 5:
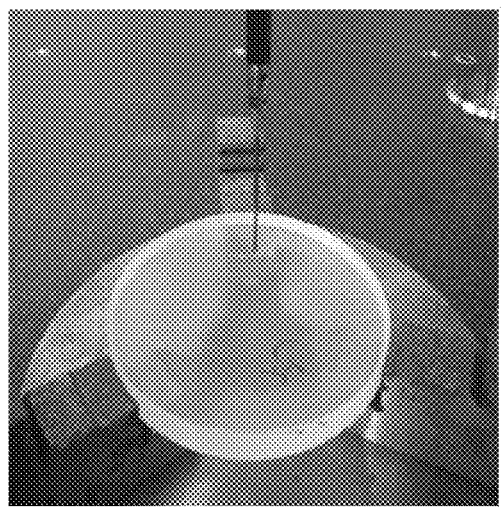
FIG. 5(a) shows a photograph of a setup for measuring surface.
FIG. 5(b) shows a aspheric surface profile reconstructed by using an inverse matrix method.
Figure 5:
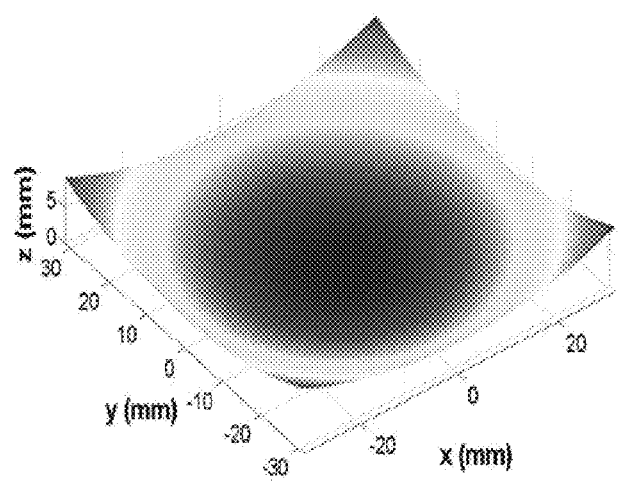

As a last step we applied the inverse matrix method to a real situation. A lens surface with unknown parameters was measured by a CONTURA G2® (Karl Zeiss®) which is a 3-dimensional measurement device. The parameters extracted from the measured coordinates using the inverse matrix method were R=121.33 mm, K=0, $a_4$=1.4193×10$^{-6}$, $a_6$=−3.4706×10$^{-9}$, $a_8$=3.8349×10$^{-12}$, and $a_{10}$=−1.5313×10$^{-15}$. Then the largest shape error $\delta z_d$ between the measured coordinate data and the data from the reconstructed equation was 2.328×10$^{-3}$ mm (about 2.3 μm). In this case, a major cause of $\delta z_d$ being higher than that in the theoretical case may be the precision limitation of the measurement equipment, which has a repeatability precision of 1.8 μm, and the uncertainty of the measurement[7], which is the doubt that exists about the result of any measurement. Accordingly, these limitations can be overcome if equipment with higher precision is used and if a large number of measurements are performed. FIG. 5 shows the measurement of the aspheric lens surface and the surface profile realized by using the reconstructed surface equation found from the inverse matrix method. The procedure for finding R, K, and the deformation coefficients of the unknown aspheric lens surface is shown with (a) photograph of the setup for the surface measurement and (b) the aspheric surface profile reconstructed by using the inverse matrix method.

In the above steps, all the programming codes, intermediate results, and necessary information for performing them may be stored in a memory device of the information processing device. In other words, the memory of the computer may be modified with the results of the steps. Of course, the performing of the steps is not limited to MATLAB®. It is just a choice out of many appropriate hardware or software means that can process the inventive steps.

In conclusion, a new method using the inverse matrix method is disclosed. From the results of this study, it may be concluded that the inverse matrix method is a powerful means for reconstructing the unknown equations of various aspheric surfaces, and it is possible for this technique to be applied to other fields.

What is claimed is:

1. A method of reconstructing aspheric surface equations from measurements for aspheric lens fabrication, the method comprising steps for:
   obtaining $z_{as}(r)$ as a lateral coordinate r varies from $r_i$ to $r_f$ in steps of $r_{step}$ by measuring a given aspheric surface that is represented by an aspheric surface equation;
   finding an error curve $\delta z_e$ for each radius of curvature R value while changing R from $R_i$ to $R_f$ in steps of $R_{step}$ wherein a conic constant K and deformation coefficients are set to 0, wherein the error curve $\delta z_e$ is defined by a deviation of the aspheric surface equation from a quadratic term $z_s(r)$ of the aspheric surface equation;
   finding the deformation coefficients from $\delta z_e$ using an inverse matrix method;
   replacing $R_N$ and $a_N$ with each R value and the deformation coefficients found from the $\delta z_e$ in $z_N$, a curve determined by the measured coordinates;
   checking if a shape error, $\delta z_d$, is within a predetermined threshold value; and
   determining $R_N$ that is closest to the original R,
   whereby the aspheric surface equations are reconstructed to improve an optical function in such a device as an optical diagnostic computer system.

2. The method of claim 1, wherein the aspheric surface equation is given by $$z(r) = \frac{\frac{r^2}{R}}{1 + \sqrt{1 - (1+K)\left(\frac{r}{R}\right)^2}} + \sum_{i=2} a_{2i} r^{2i},$$

where K is the conic constant, r is the lateral coordinate, R is the radius of curvature, and the $a_{2i}$ values are the deformation coefficients.

3. The method of claim 2, wherein the $z_{as}(r_i)$, the $z_s(r)$, the $\delta z_e$, the $z_N$, and the $\delta z_d$ are given by $$z_{as}(r) = \frac{cr^2}{1 + \sqrt{1 - (1+K)c^2 r^2}} + a_4 r^4 + a_6 r^6 + a_8 r^8 + a_{10} r^{10}$$

$$z_s(r) = \frac{cr^2}{1 + \sqrt{1 - (1+K)c^2 r^2}}$$

-continued $$\delta z_e = z_{as} - z_s$$

$$z_N(r) = \mathrm{Re}\left[\frac{c_N r^2}{1 + \sqrt{1 - (1+K)c_N^2 r^2}} + a_{N4}r^4 + a_{N6}r^6 + a_{N8}r^8 + a_{N10}r^{10}\right]$$

$$\delta z_d = |z_{as} - z_N|$$

where c and $c_N$ are the curvatures, which are the reciprocals of R and $R_N$; $z_N$ is the curve determined by the measured coordinate; $a_{N4}, \ldots, a_{N10}$ are the deformation coefficients calculated with our method, and $\delta z_d$ is the shape error, which is the deviation from the original curve $z_{as}$.

4. The method of claim 3, wherein the $r_i$ is 0, the $r_f$ is 35 mm, and the $r_{step}$ is about 3.5 mm.

5. The method of claim 3, wherein the $R_i$ is 20 mm, the $R_f$ is 120 mm, and the $R_{step}$ is about 0.0001 mm.

6. The method of claim 3, wherein the predetermined threshold value is about 10 nm.

7. The method of claim 3, further comprising steps for:
setting the R and the $R_N$ with the determined values;
finding an error curve $\delta z_e$, for each K value while changing K from $K_i$ to $K_f$ in steps of $K_{step}$;
finding the deformation coefficients from $\delta z_e$ using an inverse matrix method;
replacing $K_N$ and $a_N$ with each K value and the deformation coefficients found from the $\delta z_e$, in $z_N$, a curve determined by the measured coordinates;
checking if a shape error, $\delta z_d$, is within a predetermined threshold value; and
determining $K_N$ that is closest to the original K.

8. The method of claim 7, wherein the $K_i$ is −1.0, the $K_f$ is 1.0, and the $K_{step}$ is about 0.001.

9. The method of claim 3, wherein the inverse matrix method comprises steps for:
representing the coordinate data $(r_i, z_{as}(r_i))$ by n+1 nth-order polynomial equations with polynomial coefficients, $a_0, a_1, \ldots, a_n$;
writing the n+1 nth-order polynomial equations in a form of matrix multiplication, Xa =b, where X is a variable matrix, a is a coefficient vector, and b is a function vector; and
calculating the polynomial coefficients, $a_0, a_1, \ldots, a_n$ using $a = X^{-1}b$.

10. The method of claim 9, wherein the deformation coefficients are obtained by $$\begin{bmatrix} a_4 \\ a_6 \\ a_8 \\ a_{10} \end{bmatrix} = \begin{bmatrix} (r_0)^4 & (r_0)^6 & (r_0)^8 & (r_0)^{10} \\ (r_1)^4 & (r_1)^6 & (r_1)^8 & (r_1)^{10} \\ \vdots & \vdots & \vdots & \vdots \\ (r_{10})^4 & (r_{10})^6 & (r_{10})^8 & (r_{10})^{10} \end{bmatrix}^{-1} \begin{bmatrix} \delta z_{e0} \\ \delta z_{e1} \\ \vdots \\ \delta z_{e10} \end{bmatrix}.$$

* * * * *